United States Patent [19]
Campbell et al.

[11] 3,905,285
[45] Sept. 16, 1975

[54] SNACK FRYER

[75] Inventors: Glenn M. Campbell, Minneapolis; James G. Krassas, Anoka, both of Minn.

[73] Assignee: General Mills, Inc., Minneapolis, Minn.

[22] Filed: Apr. 27, 1973

[21] Appl. No.: 355,259

[52] U.S. Cl. ................... 99/353; 99/404; 99/443 C
[51] Int. Cl. ........................................... A47j 37/12
[58] Field of Search ...................... 99/404, 352–353, 99/354, 355, 373, 403, 405–406, 407, 423, 99/427, 443; 425/373

[56] References Cited
UNITED STATES PATENTS

| | | |
|---|---|---|
| 2,812,729 | 11/1957 | Bahlsen ......................... 99/443 C X |
| 2,853,937 | 9/1958 | Peck .................................... 99/404 |
| 3,391,634 | 7/1968 | Williams et al. ..................... 99/405 |
| 3,520,248 | 7/1970 | MacKendrick ................... 99/404 X |

*Primary Examiner*—Robert W. Jenkins
*Assistant Examiner*—Arthur O. Henderson
*Attorney, Agent, or Firm*—Gene O. Enockson; Norman P. Friederichs

[57] ABSTRACT

Disclosed is apparatus for frying shaped pieces of dough sheet to provide a shaped chip. The apparatus provides pair of continuous mated shaping surfaces, between which the dough sheet is trapped during frying. One shaping surface may be mold sections carried on a rotatable drum and the other shaping surface may be mold sections carried out on endless chain.

9 Claims, 17 Drawing Figures

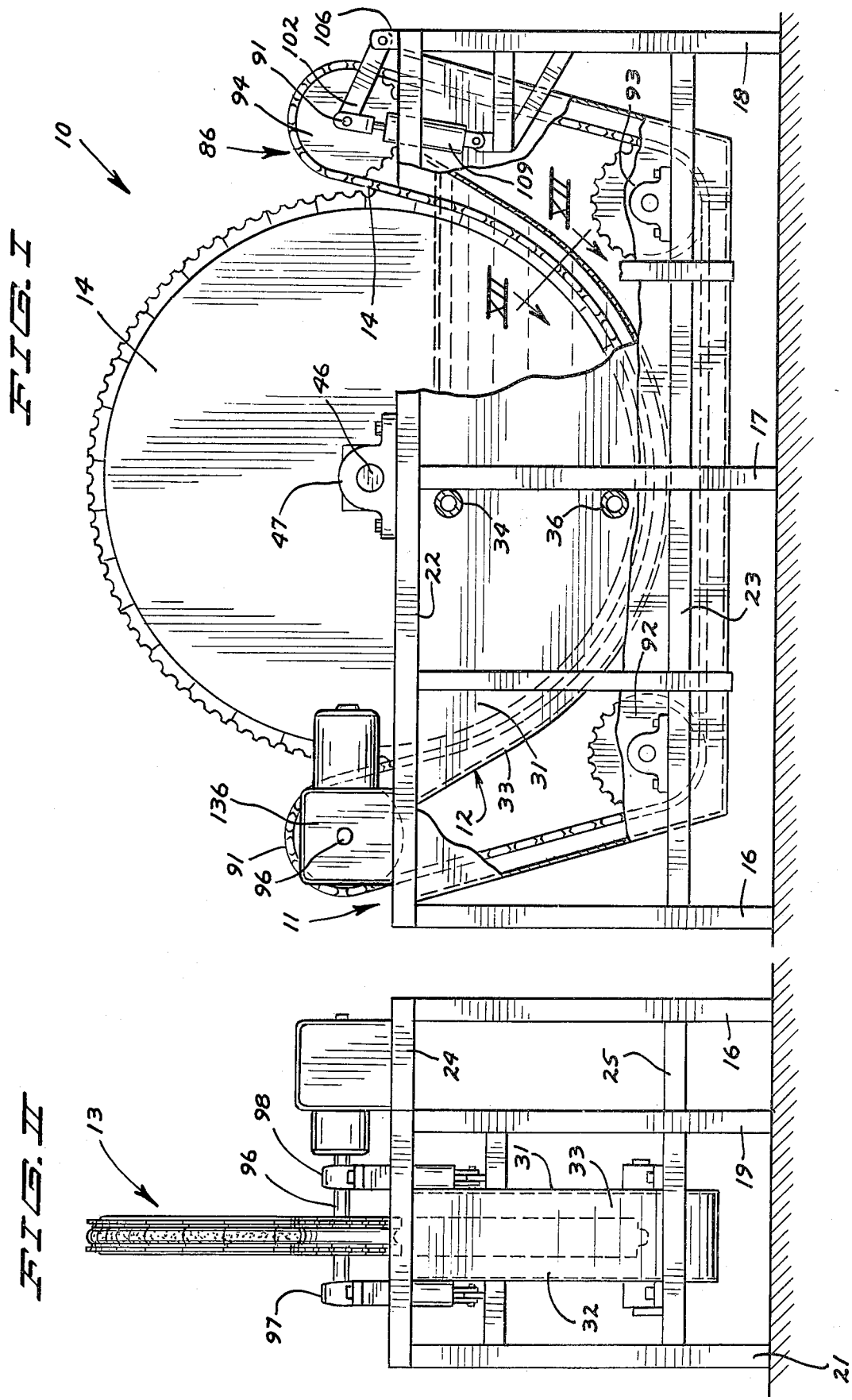

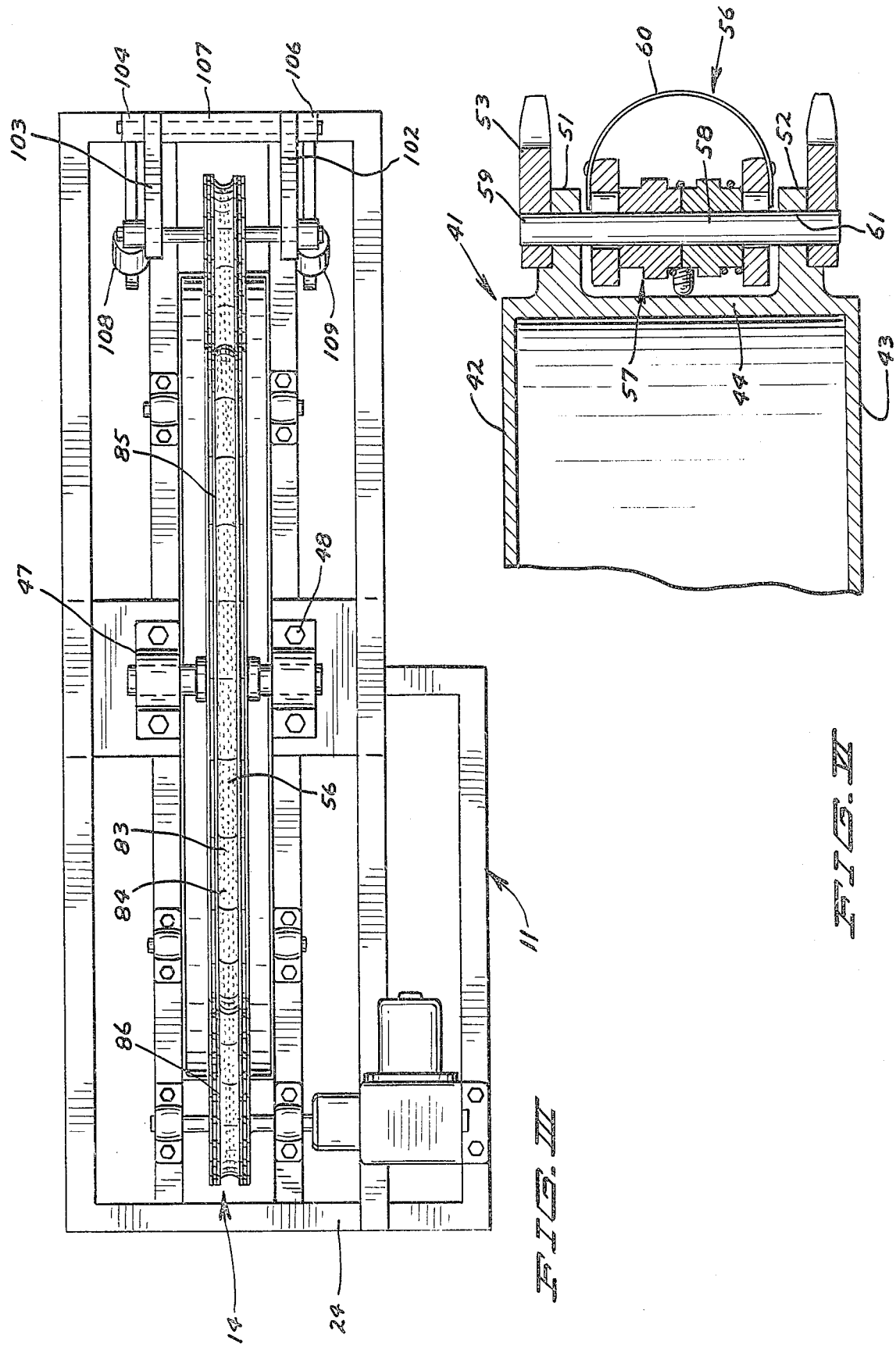

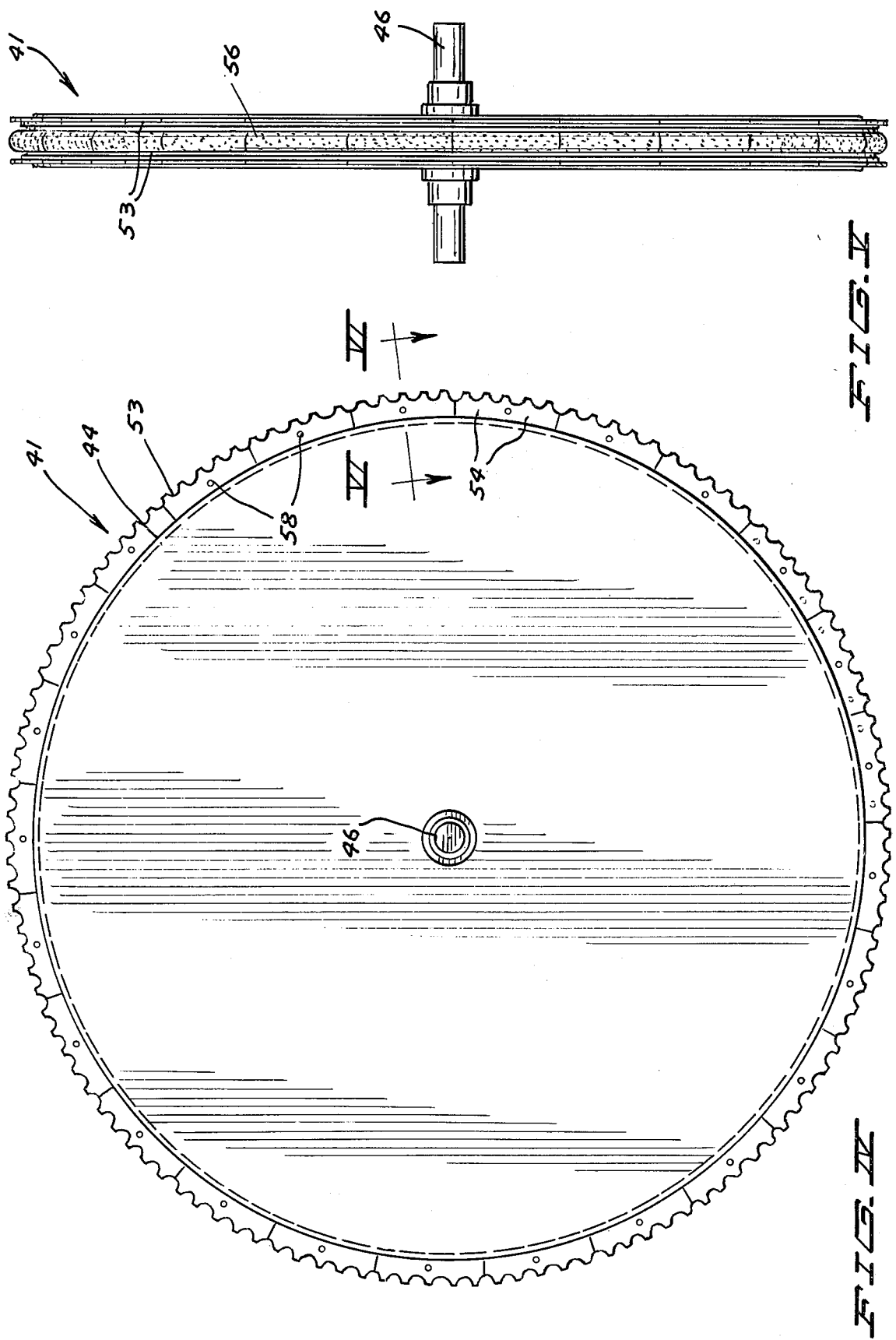

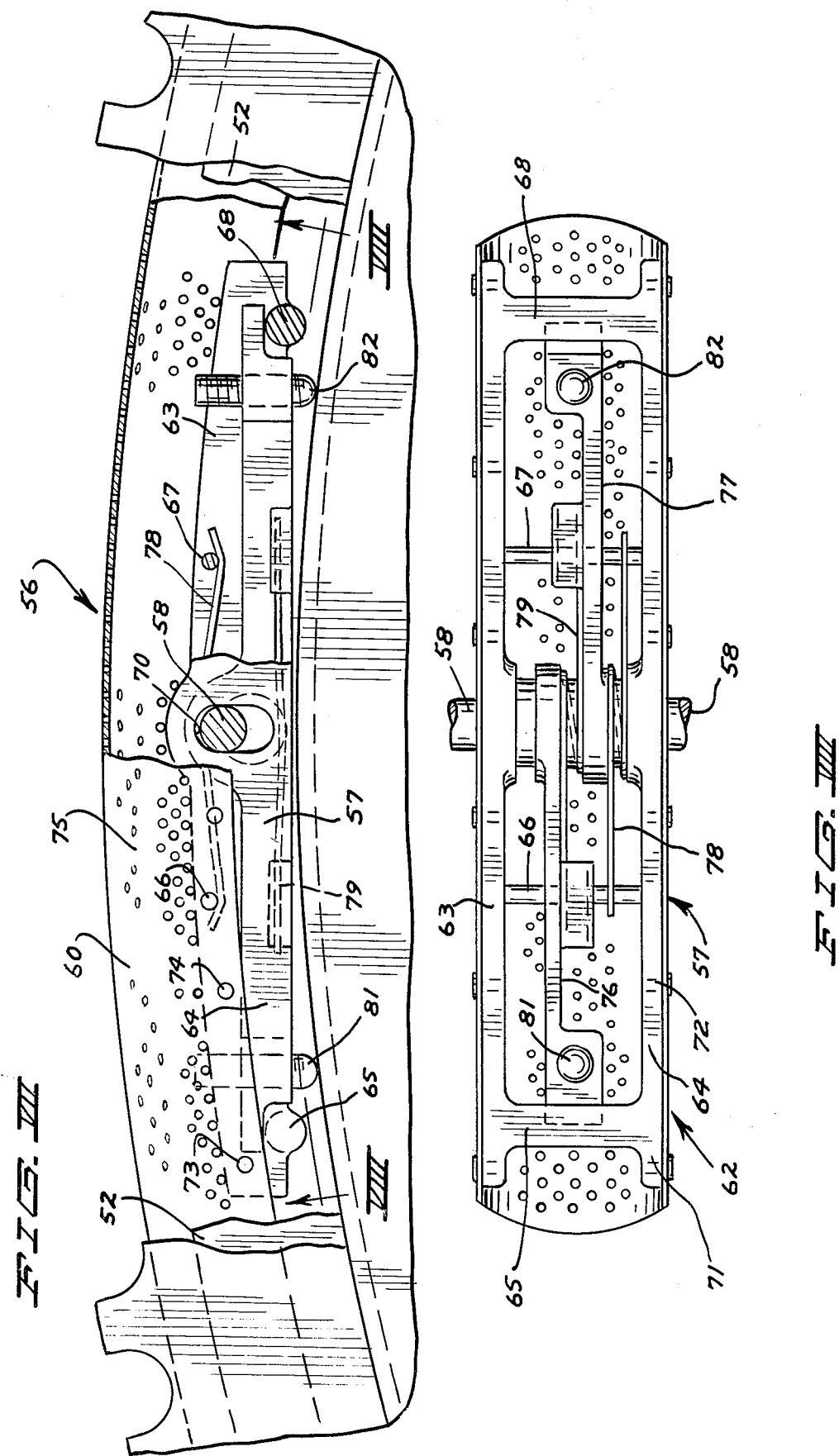

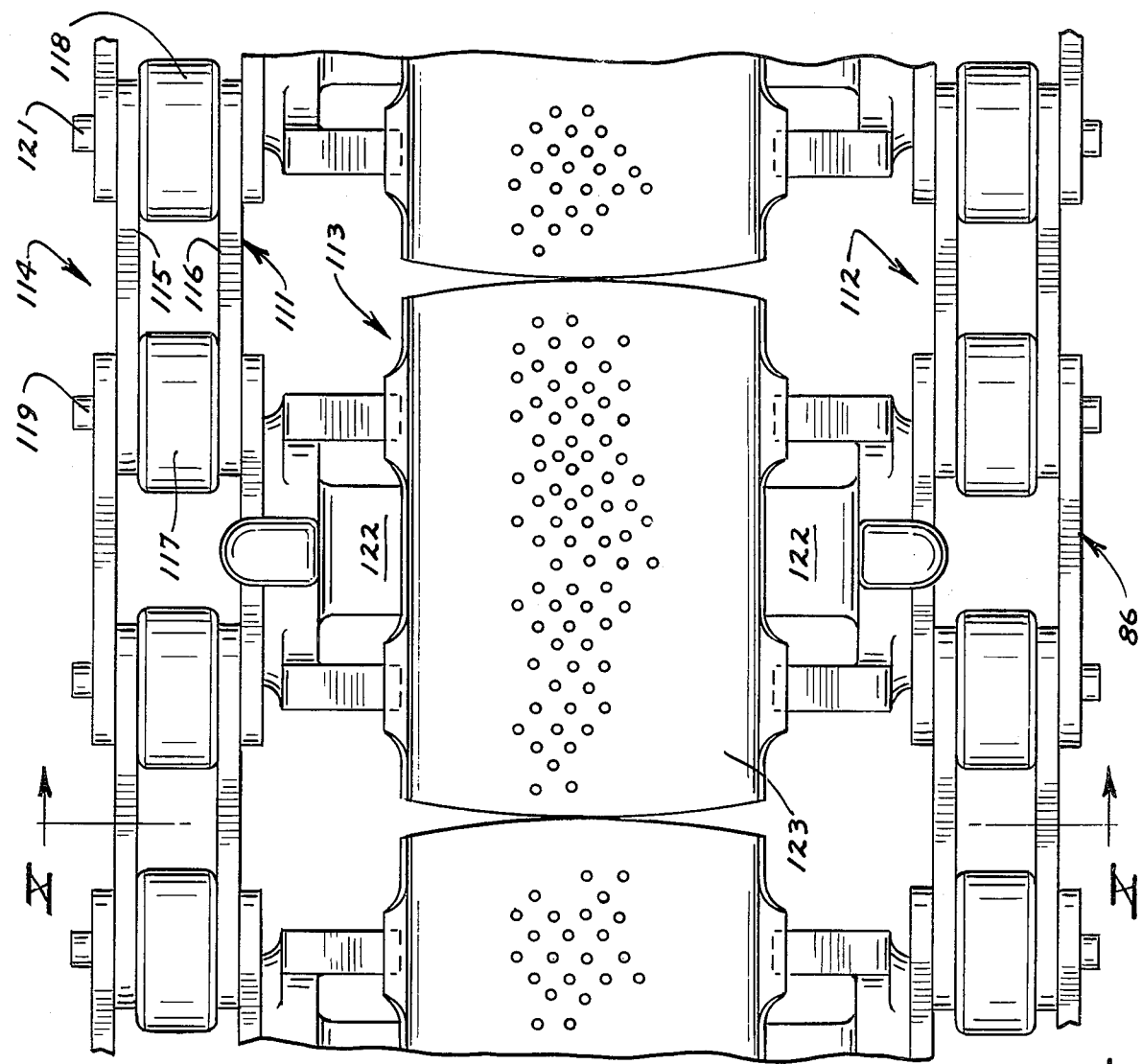
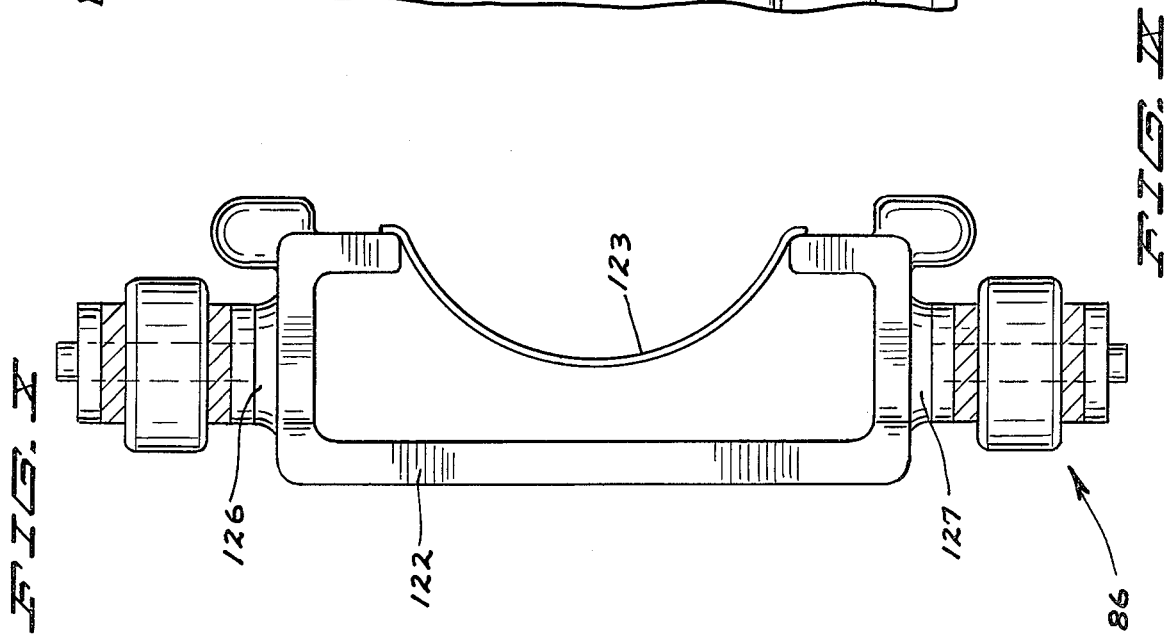

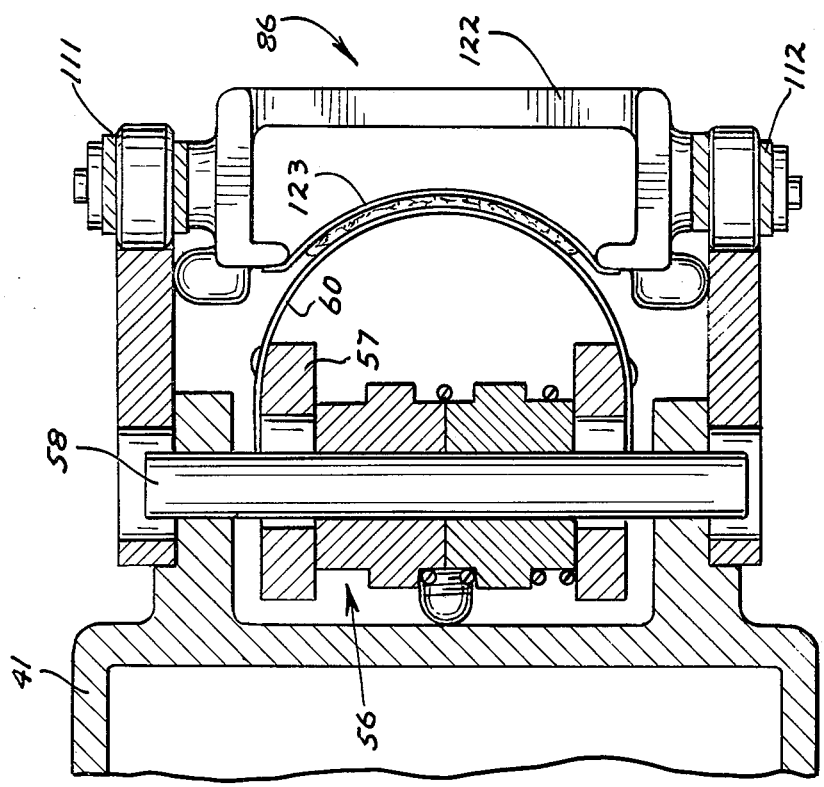
FIG. IX
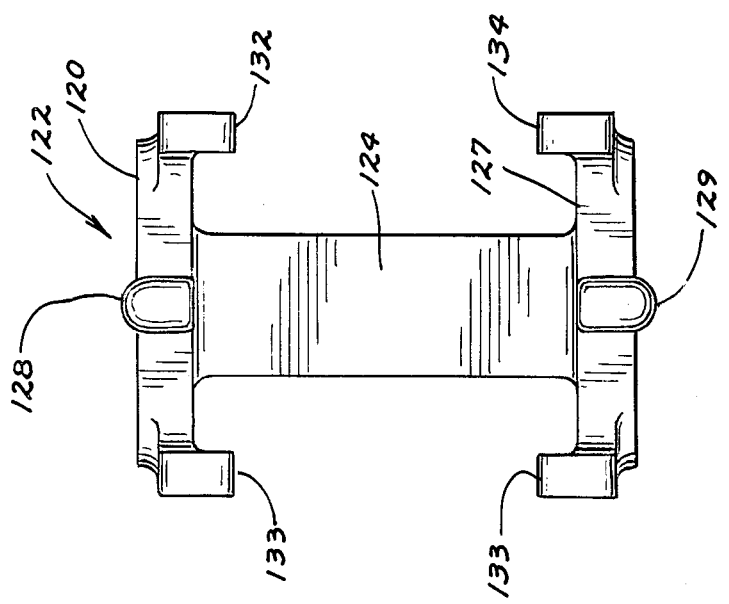
FIG. X

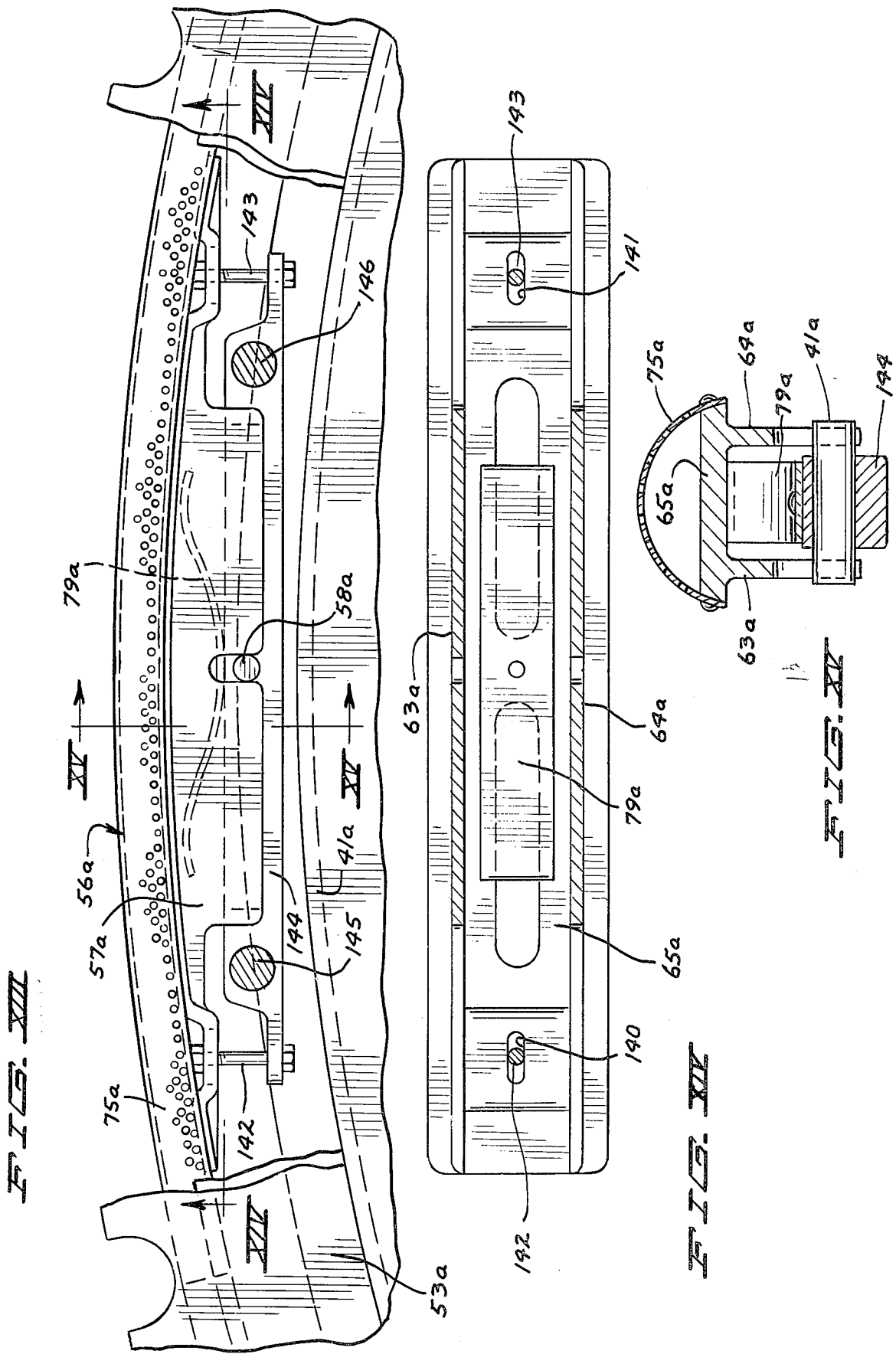

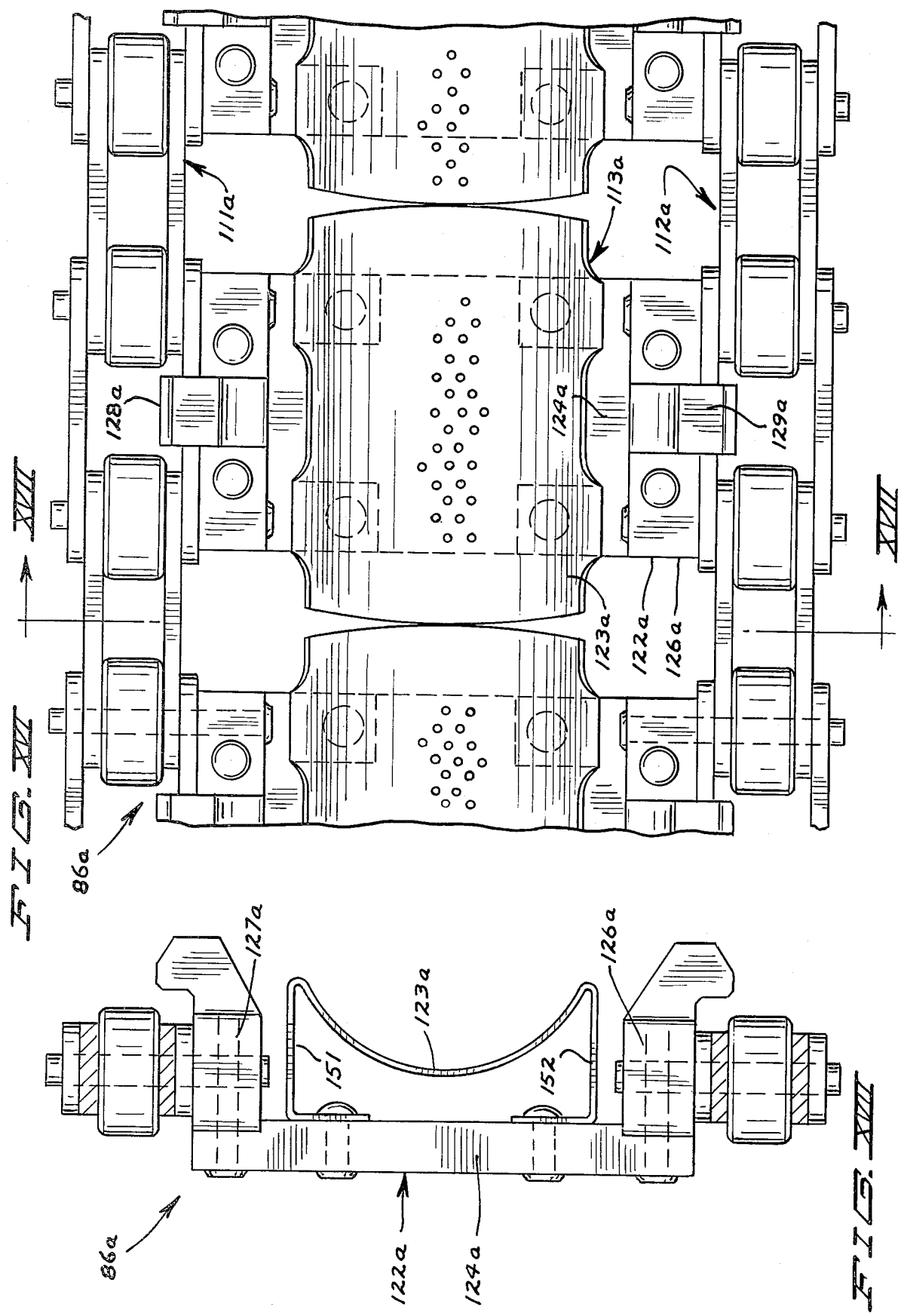

SNACK FRYER

The present invention relates to fryers and more particularly to apparatus for simultaneously frying and shaping a potato chip.

It has been known in the past to prepare chip-type snacks by forming a dough sheet and then cutting separate sections from the sheet. The individual sections are then fried in deep fat or oil. The frying of such cut sections has resulted in a problem, namely controlling the movement of the sections through the deep fat fryer. A partial solution has been provided in the past by operating a continuous belt in the upper portion of the fryer. The belt assists in moving the sections through the fryer. Nevertheless, some sections may clump together resulting in unfried or partially fried chips. Other sections may remain in the fryer too long and thus become overfried or burned. Effort has been expended to provide a fryer that will positively control the residence time of the chips in the fryer. A partial solution is disclosed in U.S. Pat. No. 2,286,644 wherein the chips are fried between a pair of belts. Such an apparatus is not completely satisfactory, however, since the chips must be fried as flat discs and thus do not have the conventional appearance of chips (i.e., slightly curved surfaces). Also, such apparatus does not provide for control of the spacing between the belts. The present invention overcomes such difficulties by frying the chips in a desired shape such as a cross section having a U-shape. Moveover, the present invention is capable of handling a continuous ribbon of chips, as shown in copending patent application, Ser. No. 355,260 Weiss et al., filed on even date herewith. Previous fryers have not had such capabilities.

The present invention in one preferred embodiment provides for highly efficient oil utilization. Frying oils have a certain life expectancy in a fryer. In other words, the oil gradually becomes degraded during the frying process due to oxidation of the oil and/or molecular break down of the oil. Also, a certain amount of the oil is consumed during the frying process such as by absorption into the fried chips. The rate of degradation in conventional fryers is much greater than the rate of oil consumption which means that periodically oil must be drawn from the fryer and discarded. The discarded and consumed oil is then replaced with fresh oil. In the present invention, it was discovered that by providing a fryer which operates at a relatively low volume, the rate of oil consumption may be the same as or greater than the rate of oil degradation. This permits maintenance of a high quality level in the frying oil without removing and discarding oil. In one preferred embodiment, the present invention provides low oil volume for frying.

IN THE DRAWINGS:

FIG. I shows the present fryer with a portion of the frying tank broken away;

FIG. II shows an end view of the present fryer;

FIG. III shows a top view of the fryer;

FIG. IV shows a side view of the fryer drum;

FIG. V shows an end view of the frying drum;

FIG. VI shows a cross-sectional view of a portion of the drum taken along the lines VI—VI in FIG. IV;

FIG. VII shows a side view of a mold section which is associated with the drum;

FIG. VIII shows a bottom view of a mold section which is associated with the drum;

FIG. IX shows a portion of the frying chain system of the present invention;

FIG. X shows a cross-sectional view of the frying chain taken along lines X—X in FIG. IX;

FIG. XI shows a carriage that is associated with the frying chain system;

FIG. XII is a cross-sectional view of the drum and chain in a mated position taken along the lines XII—XII in FIG. I.

FIGS. XIII, XIV and XV show an alternate embodiment of the drum mold sections;

FIGS. XVI and XVII show an alternate embodiment of the chain system;

Fryer 10 (FIGS. I–III) of the present invention may include a support or stand 11, a tank 12, a first continuous mold member 13 and a second continuous mold member 14. The stand 11 may be constructed of any suitable structural material such as tubular steel and/or angle iron. The stand 11 includes a plurality of supporting legs, such as 16, 17, 18, 19 and 21. The stand 11 also has a plurality of cross-support members such as 22, 23, 24 and 25. The various legs and cross supports may be welded.

The frying tank 12 may be constructed of sheet metal and includes a pair of side walls 31, 32 and an arcuate shaped bottom wall 33. The walls 31, 32 and 33 may be welded to provide a sealed tank. The frying tank 12 is mounted in stand 11 by any suitable means, for example, tank 12 may be bolted to stand 11. The tank 12 has an oil inlet pipe 34 for receiving heated oil from any suitable external heater (not shown). The tank 12 also has an outlet pipe 36 for returning the oil to the heater. The inlet pipe 34 may include a control valve for adjusting the level of the oil in tank 12. Any desired type of oil heater may be used with the present invention. Conventional heaters are typically of two types, direct external heaters and indirect external heaters. The direct external heater applies heat, such as by a gas flame, directly to a conduit through which the oil is passing. The indirect external heater applies heat to a conduit through which a heat transfer fluid such as steam is passing. The heat transfer fluid and the cooking oil both pass in separate conduits through a heat exchanger. The cooking oil picks up heat energy from the heat transfer fluid. The indirect external heater is preferred in the present invention since more uniform heat is applied to the cooking oil resulting in less degradation of the oil. The heaters in either case may be of a gas fired type or of an electrical resistance type.

The first continuous mold member 13 may be a wheel or drum 41 (FIGS. I–VI). The drum 41 may be constructed of plate metal and includes a pair of side walls 42, 43 and a peripheral wall 44. The side walls 42 and 43 may be welded to peripheral wall 44. The drum 41 is supported on a shaft 46 which is rotatably engaged in a pair of bearings 47 and 48 mounted on stand 11. The peripheral wall 44 has a pair of radially extending flanges 51 and 52. Sprocket plates 53 are secured to flanges 51 and 52 such as by bolts 54 (FIG. IV).

The drum 41 has a plurality of mold sections such as 56 supported between the flanges 51 and 52. Each of the mold sections may be substantially identical. Mold section 56 may include a carriage 57 (FIGS. VI–VIII) supported on a shaft 58 which extends through openings 59 and 61 in flanges 51 and 52. The carriage 57 has a body member 62 and a shaped perforated plate 60. The body member 62 includes a pair of side portions 63 and 64 connected by cross portions 65, 66, 67 and 68. The side portions 63 and 64 each has an eliptical opening 69 and 70 defined therein for reception of the shaft 58. The side portions 63 and 64 further include a plurality of threaded openings such as 71 and 72 for reception of screws such as 73, 74 which hold the perforated plate 60 to body member 62. The mold section 56 further includes a pair of fingers 76, 77 and a pair of springs 78, 79. The spring 78 encircles the shaft 58 and engages cross portions 66 and 67 to urge the carriage 57 away from the drum 41. The fingers 76 and 77 are mounted for movement on shaft 58 and engage the cross portions 65 and 68. The spring 79 encircles the shaft 58 and acts on the fingers 76 and 77 to urge the fingers and, in turn, the carriage 57 toward the drum 41. The fingers 76 and 77 each have a set screw 81 and 82, respectively, which limit the movement of fingers 76 and 77 toward the drum 41. The spring 79 is sufficiently strong to overcome the force of the spring 78. The carriage 57 may be moved away from the drum 41 by driving the set screws 81 and 82 in fingers 76 and 77 inwardly. The carriage 57 may be moved toward the drum 44 by driving the set screws 81 and 82 outwardly. The perforated plate 60 may be constructed of metal sheet, for example, 1/16 inch in thickness and having spaced holes defined therein, for example, openings 1/16 inch in diameter. There may be, for example, 100 holes per square inch. The perforated plate 60 may be formed in the desired shape of the final chip such as U-shaped in cross section. The plate 60 may provide a convex frying surface that preferably is of a constant radius. Such a constant radius permits frying of uniformly shaped chips without close control of chip positioning on the mold surface. The remaining mold sections such as 83, 84 and 85 may be constructed identical to mold section 56.

The second continuous mold member 14 may be a continuous belt or chain system 86 as shown in FIGS. I–III, X and XI. The chain system 86 is supported on sprocket wheels 91, 92, 93 and 94. Sprocket wheel 91 has a pair of rows of teeth spaced substantially the same as the sprocket teeth rows on the drum 41. Sprocket wheel 91 is mounted on a shaft 96 which is rotatably mounted in bearings 97 and 98 supported on the stand 11. The sprocket wheels 92 and 93 may be identical to sprocket wheel 91. The sprocket wheel 94 may be similar; however, it is mounted in such a manner that it may be pivoted to tighten chain system 86. In other words, sprocket wheel 94 has a shaft 91 which is rotatably mounted in bearings (not shown) in levers 102 and 103. The levers 102 and 103 are pivotably mounted in the flanges 104 and 106 of stand 11 by the pivot pin 107. A pair of pneumatic or hydraulic-air cylinders 108 and 109 are provided for driving the sprocket wheel upwardly to tighten the chain 86. The cylinders 108 and 109 are supported on stand 11 at the lower ends thereof and secured to levers 102 and 103 at the upper ends thereof.

The chain system 86 is designed for engagement with the various sprocket teeth on drum 41 and sprocket 91, 92, 93, 94. The chain system 86 (FIGS. VII and VIII) includes a pair of link chains 111 and 112 having a plurality of mold sections 113 mounted therebetween. Each link 114 includes a pair of straps 115 and 116 having rollers 117 and 118 mounted therebetween. The links 114 are held together by pins 119 and 121. The mold section 113 includes a carriage 122 (FIG. XI) and a shaped perforated plate 123. The carriage 122 has a base plate 124 and a pair of upright flanges 126 and 127. The flanges 126 and 127 each have an outwardly extending projection 128, 129 for purposes hereinafter described. The flanges 126 and 127 each have a pair of inwardly extending projections 131, 132 and 133, 134. The carriage 122 may be constructed of metal such as by casting. The flanges 126 and 127 each has a pair of openings 120 through which the pins 119 and 121 may extend for purposes of mounting the carriage 122 on the link chains 111 and 112. The perforated plate 123 is supported on the carriage 122 and may be welded to the projections 131, 132, 133 and 134. The chain system 86 may be driven by an electric motor 136. The perforated plate 123 may be constructed of the same material as plate 60. The plate 123 provides a concave frying surface that may mate with perforated plate 60 of drum 41 as shown in FIG. XII. The projections 128 and 129 engage the inside surface of the sprocket plates 53 to align the mold sections 113 with the mold sections 56.

The fryer 10 may be placed in operation by filling the tank 12 with oil at a suitable frying temperature such as 250° to 410°F. The electric motor 136 is then placed in operation to drive the chain system 86. The chain system 86 rides on the various sprocket wheels 91, 92, 93 and 94. The upper reach of the chain system 86 impinges against the lower portion (e.g., lower one-half) of the drum 41 with the teeth of the sprocket plates 53 engaged between the rollers such as 117 and 118 of the link chains 111 and 112. The engagement of drum 41 with chain system 86 drives the drum 41 and provides a definite spacing between the drum 41 and chain system 86. The desired spacing between the mold plates 75 and 123 may be set by adjusting the set screws 81 and 82, for example, to a spacing of about 0.02 to 0.10 inches prior to placing the system in operation. Such spacing is normally maintained during operation. However, if for any reason two layers of dough becomes superimposed, the spring 79 permits the mold section 56 to move away from mold section 113 thus accommodating the additional dough thickness. This lessens the likelihood of the fryer becoming jammed. Suitable dough sheet 137 is fed to the fryer 10 and is held between the continuous mold members 13 and 14 as it is carried through the tank 12 of frying oil. The mold members 13 and 14 travel in an arcuate path through the tank 12. The residence time in the fryer 10 may be adjusted, for example, in the range of 8 to 20 seconds by adjusting the speed of motor 136 and thus the chain system 86. The fryer may have valve controls on the oil inlet line to adjustably control the oil level. The residence time of the chips in the fryer may be adjusted by increasing or decreasing the level of frying oil in tank 12 thus increasing or decreasing the length of the frying path or zone.

Alternate embodiments of the drum 41a and the chain system 86a are shown in FIGS. XIII–XVII. The drum 41a (FIGS. XIII, XIV and XV) is constructed similar to drum 41. The drum 41a includes a plurality of mold sections such as 56a which have a carriage 57a supporting a perforated frying surface 75a. The carriage 57a has a pair of side portions 63a and 64a and cross portions 65a. The side portions 63a and 64a have openings 69a and 70a defined therein for reception of the shaft 58a, which maintains alignment of the carriage 57a with the drum 75a. The cross portions 65a have openings 140 and 141 for reception of bolts 142 and 143. The openings 140 and 141 are slightly larger than the shafts of the bolts 142 and 143 so that the carriage 57a may easily slide on such screws. The bolts 142 and 143 are threadedly engaged in a support block 144 which is secured to the sprocket plates 53a by pins 145 and 146. A spring 79a is mounted on the support block 144 and engages the cross portion 65a to urge the carriage 57a away from the drum 41a. The bolts 142 and 143 may be tightened to move the carriage 57a toward the drum 41a. The bolts 142 and 143 may be loosened which permits the spring 79a to move the carriage 57a away from the drum 41a.

The chain system 86a (FIGS. XVI and XVII) may be constructed similar to chain system 86 and includes a pair of link chains 111a, 112a and a plurality of mold sections 113a. The mold sections 113a each include a carriage 122a and a perforated plate 123a. The carriage 122a has a base plate 124a and a pair of flanges 126a and 127a which may be bolted to the base plate 124a. The flanges 126a and 127a have projections 128a and 129a for guiding the chain with respect to the drum 41a. The perforated plate 123a has a pair of legs 151 and 152 which support the plate 123a on the base plate 124a. The legs 151 and 152 may be secured to the plate 124a by bolts or rivets. The chain system 86a operates substantially as described with respect to chain system 86.

Although certain embodiments have been specifically described, it must be recognized that various changes and modifications may be made without departing from the scope of the present invention. For example, the drum 41 or 41a may carry a plurality of rows of mold sections 56 or 56a. Likewise the chain system 86 or 86a may carry a plurality of rows of mold sections 113 or 113a. Such an embodiment would be capable of simultaneously handling several ribbons of dough sheet.

The embodiments of the invention in which an exclusive property or privilege is claimed are defined as follows:

1. Apparatus for frying shaped chip-type snack products comprising:
   tank means including a zone for containing heated frying oil;
   first mold means including rotatable drum means and first shaping means, said drum means being disposed partially within said oil containing zone and partially outside of said oil containing zone, said first shaping means being supported by said drum means for movement into, through and out of said oil containing zone, said first shaping means providing a first continuous shaping surface;
   second mold means including conveying means and a second shaping means, said conveying means being disposed partially within said oil containing zone and partially outside of said oil containing zone, said second shaping means being supported by said conveying means for movement into, through and out of said oil containing zone, said second shaping means providing a second continuous shaping surface; and
   spacing means for positively spacing said first shaping surface and said second shaping surface during passage through said tank means, said spacing means including means for fixedly maintaining at least a minimum spacing between said first and second shaping surfaces and said spacing means further including spring means for urging said first and second shaping surfaces toward said minimum spacing whereby said first shaping surface and said second shaping surface cooperate to provide a cavity for containing and shaping snack products as said products are carried through said oil containing zone.

2. The apparatus of claim 1 wherein said drum means and said conveying means include control means for maintaining the same rate of speed through said oil containing zone.

3. The apparatus of claim 2 wherein said control means include sprocket means associated with said drum means and chain link means associated with said conveying means and wherein said sprocket means and said chain link means are drivingly engaged whereby the first shaping surface and said second shaping surface travel through said oil containing zone at the same rate of speed.

4. The apparatus of claim 3 wherein said first shaping surface means comprise a plurality of first mold sections mounted around said drum means and said second shaping surface means comprise a plurality of second mold sections supported on said link chain means.

5. The apparatus of claim 4 wherein said link chain means impinge against said drum means thereby holding said second mold sections adjacent said first mold sections while said first and second mold sections are conveyed through said oil containing zone.

6. The apparatus of claim 5 wherein said link chain means encircles only a portion of said drum means.

7. The apparatus of claim 5 wherein said first and second mold sections are arcuate in cross section and have a constant radius whereby said uniformly shaped snacks may be formed in the absence of close indexing of chips with respect to the mold sections.

8. Apparatus for frying shaped chip-type snack products comprising:
   tank means including a zone for containing heated frying oil;
   first mold means including rotatable drum means and first shaping means, said drum means being disposed partially within said oil containing zone and partially outside of said oil containing zone, said first shaping means being supported by said drum means for movement into, through and out of said oil containing zone, said first shaping means providing a first continuous shaping surface;
   second mold means including conveying means and a second shaping means, said conveying means being disposed partially within said oil containing zone and partially outside of said oil containing zone, said second shaping means being supported by said conveying means for movement into, through and out of said oil containing zone, said second shaping means providing a second continuous shaping surface;
   whereby said first and second shaping means move through said oil containing zone in an arcuate path;
   spacing means for positively spacing said first shaping surface and said second shaping surface during passage through said tank means whereby said first shaping surface and said second shaping surface cooperate to provide a cavity for containing and shaping snack products as said products are carried through said oil containing zone; and control means for adjusting the level of oil in said zone to adjust the residence time of said shaping means in said oil.

9. The apparatus of claim 8 wherein said drum means substantially fills said tank means thereby limiting the volume of said oil containing zone.

* * * * *